United States Patent [19]

Baresh

[11] Patent Number: 4,703,648

[45] Date of Patent: Nov. 3, 1987

[54] GAUGING APPARATUS AND METHOD

[75] Inventor: Joseph M. Baresh, Seattle, Wash.

[73] Assignee: The Boeing Company, Seattle, Wash.

[21] Appl. No.: 813,534

[22] Filed: Dec. 26, 1985

[51] Int. Cl.[4] .......................................... G01N 19/00
[52] U.S. Cl. ..................................... 73/104; 33/552;
33/175
[58] Field of Search .................... 73/104, 802; 33/533,
33/555, 552, 551, 549, 553, 554, 175

[56] References Cited

U.S. PATENT DOCUMENTS

| | | | |
|---|---|---|---|
| 2,265,373 | 12/1941 | Johnson . | |
| 2,378,039 | 6/1945 | Schenker . | |
| 2,472,754 | 6/1949 | Mead . | |
| 2,499,324 | 2/1950 | Mead . | |
| 2,881,486 | 4/1959 | Soref . | |
| 2,977,533 | 3/1961 | Savage . | |
| 3,049,752 | 8/1962 | Jorda et al. | 73/104 |
| 3,110,112 | 11/1963 | Dalgleish | 33/552 |
| 3,983,632 | 10/1976 | Halstead . | |
| 4,233,745 | 11/1980 | Ramon et al. | 33/533 |
| 4,400,884 | 8/1983 | Baresh et al. . | |
| 4,473,953 | 10/1984 | Sauvage . | |

*Primary Examiner*—Stewart J. Levy
*Assistant Examiner*—Robert R. Raevis
*Attorney, Agent, or Firm*—Christensen, O'Connor, Johnson & Kindness

[57] ABSTRACT

An apparatus and method for gauging the amount of warpage in a composite panel is disclosed. The apparatus is used to measure the gaps between a cured composite panel (12) and the mold (10) upon which the panel was formed. The gaps are indicative of warpage in the panel. The apparatus includes inelastically deformable gauging strips (20) that are placed at selected locations on the mold. Also included is a mechanism (22,42,44) for accuraely positioning the panel adjacent to the mold after the strips are in place so that the panel contacts and partially crushes the strips. After the panel is removed, the thickness of each crushed gauging strip is measured at numerous points along its length. Variations in the thickness of the strip indicate the presence of gaps between the mold and panel, hence warpage in the panel.

23 Claims, 6 Drawing Figures

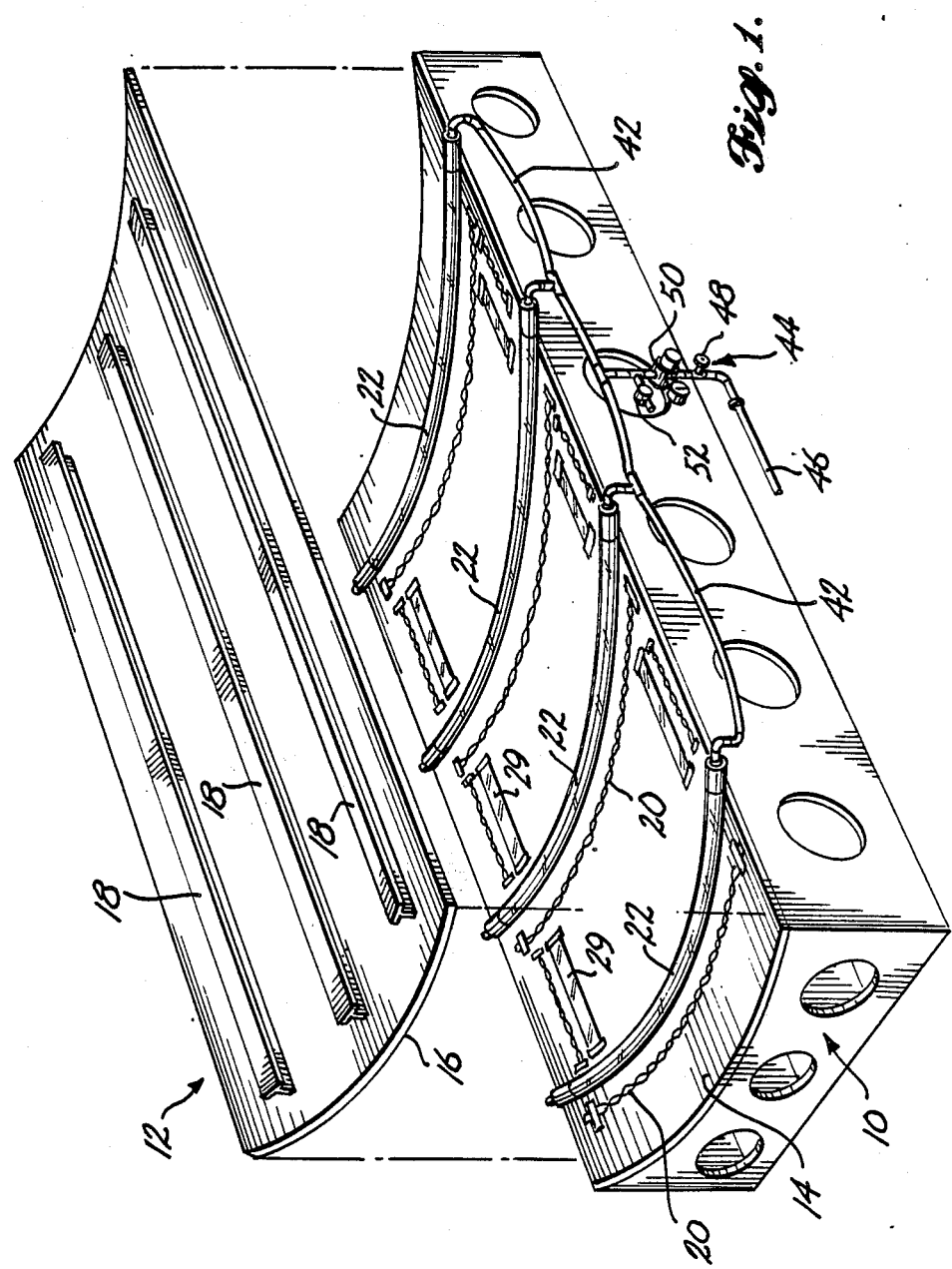

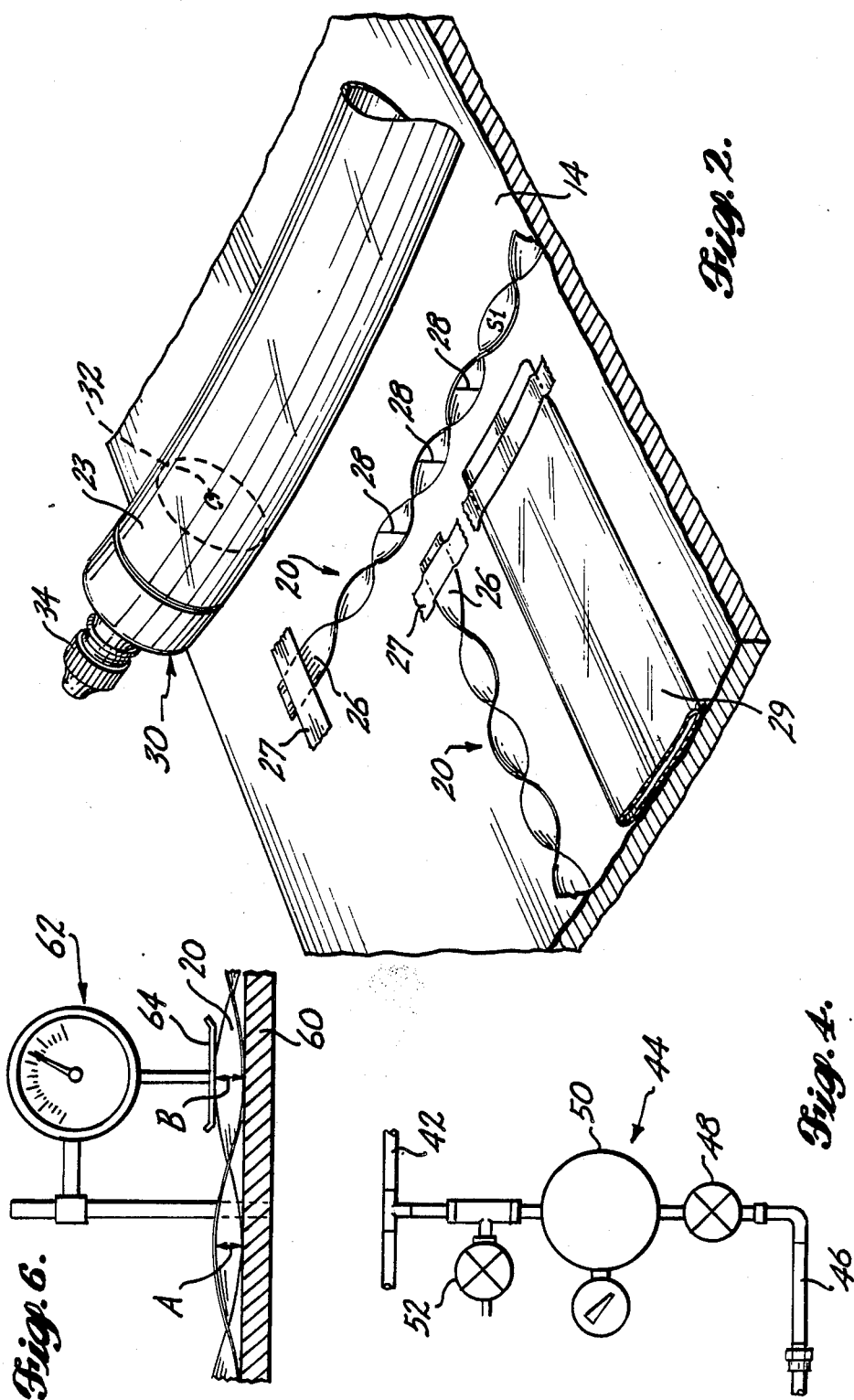

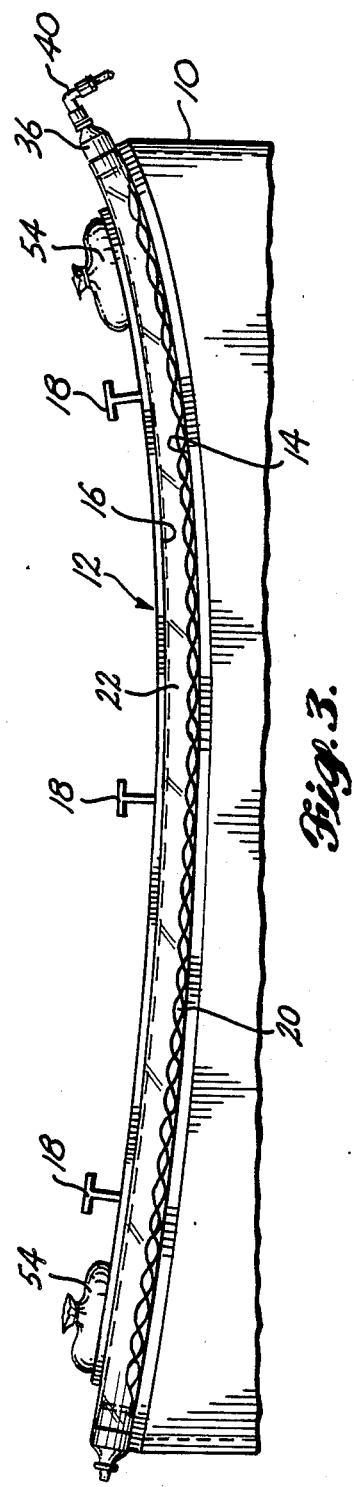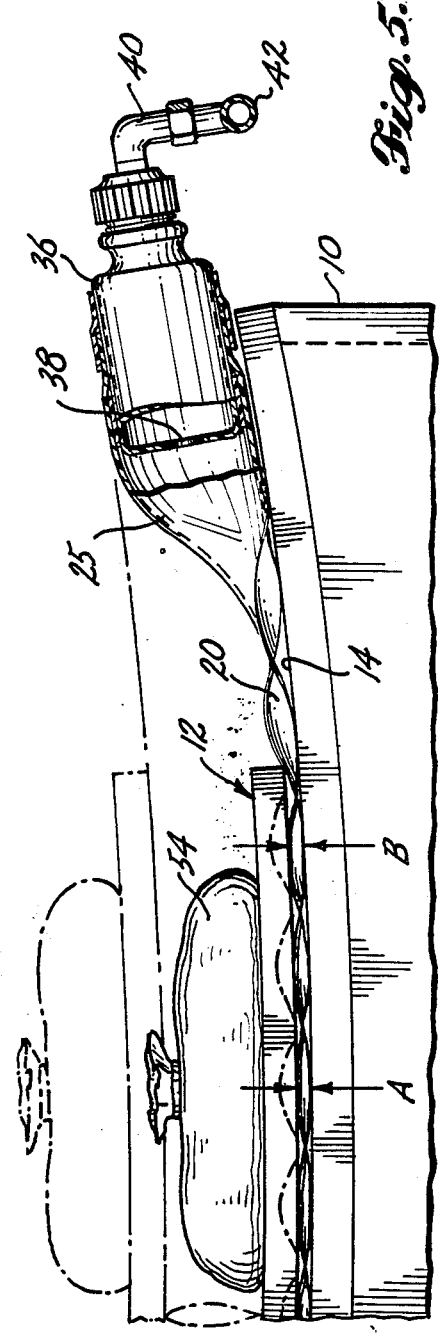

4,703,648

GAUGING APPARATUS AND METHOD

TECHNICAL AREA

This invention relates to apparatus and methods for gauging the amount of warpage in a panel.

BACKGROUND OF THE INVENTION

The use of parts formed of composite material is currently very popular in the aerospace industry where the lightweight, high-strength characteristics of such parts are especially desirable. Composite parts are typically formed of high-strength anisotropic fibers such as graphite, embedded within a thermosetting resin matrix. A composite part, such as a wing panel, is fabricated by creating a stack of composite material layers on the surface of a mold that is contoured to create the desired panel shape. The mold may be made of metal or previously cured composite material. After the stack is laid up, the mold and stack of composite layers are placed in an autoclave where the resin is cured to create a homogeneous composite panel.

Composite panels tend to warp during curing. Although a minor amount of warping is tolerable, severe warping will result in rejection of the panel. The extent of warpage is typically assessed by measuring the differences between the shape of the mold and the shape of the finished panel.

One method of quantifying these shape differences is to measure the thickness of the gaps between the panel and the mold while the cured panel is positioned on the mold in the same location it was when it was cured. In the past, feeler gauges were used to measure these gaps. Feeler gauges are undesirable because they can only be used to measure gaps along the periphery of the panel. Warpage in the central area of the panel cannot be determined using feeler gauges.

Another prior technique used to measure the thickness of gaps between a composite panel and a metal mold utilizes a conventional eddy current sensor and ultrasonic thickness gauge. The eddy current sensor is placed on the surface of the composite panel that faces away from the mold. The sensor detects the location of the metal mold, thereby providing a measure of the distance between the sensor supporting surface of the panel and the mold. Next, the ultrasonic thickness gauge is positioned at the same location on the panel. The ultrasonic gauge provides a measurement of the thickness of the composite panel. The difference between the distance measured by the eddy current sensor and the thickness of the composite panel is a measure of the gap (hence warpage) at the point of measurement. This technique has the disadvantage that it requires the use of relatively sophisticated instruments that must be carefully positioned on the panel by the operator. When large composite panels are used, it is impossible for the operator to reach the central area of the panel by hand. Climbing onto the panel is unacceptable since the added operator's weight unacceptably distorts the panel shape. Thus, measurements in the center of large panels using this technique require the use of a bridge-like structure or some other apparatus to support the operator as the eddy current and ultrasonic measurements are being made. This technique also has the disadvantage that eddy current sensors are unusable when the mold is formed of a nonconductive (i.e., a composite) material.

SUMMARY OF THE INVENTION

This invention is directed to an apparatus and method for gauging the differences between the shape of a part and the shape of the mold upon which the part was formed in order to assess the amount of part warpage. More particularly, the apparatus and method of the invention are useful in measuring the thickness of the gap between a part having a large surface, such as a cured composite panel, and the mold used to form the panel when the panel is positioned on the mold in the same location it was when the resin used to form the composite panel was cured.

In accordance with certain aspects of this invention, elongate, substantially inelastically deformable members, or "gauging strips," are positioned on the mold, between the mold and the panel. In the preferred embodiment the gauging strips are narrow strips of aluminum foil that are twisted about their longitudinal axes into spirals. Also included is a control mechanism for holding the panel adjacent the mold, after the gauging strips are in place, and then moving the panel so that the panel crushes the gauging strips. After the gauging strips are crushed, the panel is removed from the mold by the control mechanism. Thereafter, the thickness of each gauging strip is measured at points along its length. Variations in the thickness of the crushed gauging strip along its length are indicative of differences between the shape of the composite panel and the shape of the mold. Thus, gauging strip thickness variations are indicative of the amount of panel warpage.

In accordance with other aspects of this invention, the control mechanism for holding the panel above the mold and moving the panel to crush the gauging strips includes inflatable tubes that are placed alongside selected gauging strips. When inflated, the tubes support the panel above the mold and gauging strips. The tubes are deflated to slowly lower the panel into contact with the gauging strips. After the panel has settled onto and crushed the gauging strips, the tubes are reinflated to evenly lift the panel off the gauging strips without further disturbance of the gauging strips. After the panel is removed, the thickness of the gauging strip is measured at various points along its length to determine the extent of panel warpage.

As will be readily appreciated from the foregoing description, the invention provides a method and apparatus for measuring warpage in a part having a large surface, such as a composite panel, at any location on the surface. To this end the gauging strips may be positioned along the edge as well as from edge-to-edge of the mold. Thus, warpage in the panel can be determined along its edges as well as at its central region. Because the invention does not require the positioning of instruments on the panel as gap measurements are being made, the invention eliminates the need for operator support structures of the type required with the eddy current and ultrasonic gap measuring instruments.

BRIEF DESCRIPTION OF THE DRAWINGS

The foregoing features and advantages of the invention will be better understood from the following detailed description of a preferred embodiment of the invention when considered in conjunction with the attached drawings wherein:

FIG. 1 is an isometric view of a gauging apparatus formed in accordance with this invention;

FIG. 2 is an enlarged view of a portion of FIG. 1 showing gauging strips and a support tube in position atop the mold;

FIG. 3 is a front elevational view of the apparatus of FIG. 1 showing a composite panel supported adjacent to the gauging strip;

FIG. 4 is a schematic diagram of a portion of pneumatic circuitry used to inflate and deflate the support tubes illustrated in FIGS. 1-3;

FIG. 5 is an enlarged front elevational view of a portion of the apparatus shown in FIG. 1; and, FIG. 6 is a diagram of a measurement device for measuring the thickness of the gauging strips.

DETAILED DESCRIPTION OF THE PREFERRED EMBODIMENT

FIGS. 1 and 3 show the main components of a gauging apparatus formed in accordance with this invention in position atop the lay-up surface 14 of a mold 10. The mold 10 is the same mold used to form a composite panel 12 shown suspended above the mold in the figure. Specifically, the lay-up surface 14 of the mold 10 is shaped to create the desired curvature on the exterior surface 16 of the panel 12. The illustrated panel is an aircraft wing panel formed by laying up a stack of composite material layers directly upon the lay-up surface 14 of the mold. The composite material layers are formed of side-by-side oriented strips of fiber rovings held together by a resin binder. As shown, the panel 12 typically includes reinforcing stringers 18 that are attached to the surface composite material layers during lay-up of the panel. After lay-up of the composite material layer stack is complete, the mold 10 and the stack are placed in an autoclave, and the stack is cured to form a homogeneous panel. After curing, the panel is removed from the mold so that the gauging apparatus of the invention can be positioned on the mold.

The gauging apparatus includes a plurality of elongate gauging strips 20 arrayed atop the lay-up surface 14 of the mold 10 at selected locations. Some of the gauging strips are laterally arrayed across the center region of the lay-up surface of the mold and others are located near the edge of the lay-up surface. Preferably, the gauging strips are formed of substantially inelastically deformable strips of aluminum foil twisted about their longitudinal axes into spirals. When the panel 12 is lowered onto the gauging strips in the manner hereinafter described, the strips are crushed. If the panel is warped, the amount of crushing of each gauging strip will vary from one end of the gauging strip to the other and/or from gauging strip to gauging strip. It is the resulting variation in gauging strip thickness that provides a measurement of the amount of panel warpage.

For accurate warpage measurement, it is important that the composite panel be moved evenly and simultaneously onto all of the gauging strips. To this end, the preferred embodiment of a gauging apparatus formed in accordance with this invention includes support tubes 22 placed upon the lay-up surface 14 of the mold 10 next to the gauging strips 20 that extend laterally across the mold. The support tubes 22 are thin-walled flexible tubes used for supporting the panel 12 above and lowering the panel onto the gauging strips. More particularly, one end of each support tube is connected to a pneumatic circuit that includes a mechanism for inflating and deflating the tubes. After the tubes are inflated, the composite panel 12 is positioned upon the tubes in precise alignment with lay-up surface 14. The inflated diameter of each support tube 22 is greater than the maximum thickness of the gauging strips 20, thus, no crushing of the gauging strips occurs while the tubes are inflated. After the composite panel 12 is positioned upon the tubes, the tubes are deflated to allow the composite panel to settle onto and crush the gauging strips. The tubes are then reinflated so that the composite panel is gradually moved away from the gauging strips. After the composite panel is raised completely above the gauging strip by the tubes, the panel is removed. Thereafter the crushed gauging strips are removed and the thickness of each strip is measured at various points along its length to determine variations in the amount of crushing, which are indicative of the amount of panel warpage.

With reference to FIGS. 2, 3 and 5, the gauging strips 20 formed in accordance with this invention are preferably made of strips of aluminum foil that are twisted into a spiral shape about their longitudinal axes. Aluminum strips that are formed into this configuration exhibit very little spring-back when deformed (i.e., the deformation is substantially inelastic). Thus, an accurate determination of the actual amount of crushing can be obtained using such strips.

The ends 26 of the gauging strips 20 are secured to the lay-up surface 14 of the mold with adhesive tape 27. When secured to the mold, each gauging strip has a number of places along its length where the strip is on its edge. At these places the strip extends substantially orthogonally upward from the lay-up surface of the mold. These places, for convenience, will be referred to as measurement nodes 28. Between the measurement nodes 28 the gauging strip is inclined with respect to the lay-up surface and is therefore lower (as measured upwardly from the lay-up surface) relative to the measurement nodes 28. Because of this greater elevation, the measurement nodes experience the greatest amount of crushing and are preferably where the gauging strip is measured after crushing.

The number of and spacing between measurement nodes 28 depends upon the thickness and width of the foil strip and the amount it is twisted. For example, one preferred gauging strip is formed of 0.002 inch thick, 0.20 inch wide foil twisted to three revolutions per foot yielding a measurement node every two inches.

Prior to or after twisting the gauging strips, the measurement nodes 28 are marked with suitable indicia representative of a particular position on the composite panel where warpage measurements are crucial. For example, as shown in FIG. 2, a measurement node can be marked with the indicium "S1" to indicate the point on the composite panel where a particular stringer is attached.

The gauging strips 20 can be positioned on the mold in any particular location where measurements of warpage are important. For instance, the gauging strips running laterally across the lay-up surface of the mold shown in FIG. 2 are positioned at locations on the mold corresponding to locations where ribs will be attached to the panel 12. Gauging strips are also positioned along the edges of the mold corresponding to where the edges of the panel will be fastened to a wing spar.

The support tubes 22 are preferably thin-walled polyethylene tubes. When the support tubes 22 are completely deflated, they lay flat on the mold. The flattened tubes prevent the panel from directly contacting the mold. Thus, the measurement nodes 28 of the guide strip 20 will never be crushed to a thickness less than that of the flattened tubes. This minimum thickness (i.e., the thickness of the deflated tubes) is used as a baseline thickness for calibrating measurement devices that are used for measuring the crushed gauging strip. That is, the baseline thickness is subtracted from the total measured thickness of the gauge strip to obtain the net amount of crushing of the gauge strip.

It is not necessary to provide a support tube next to every gauging strip in order to properly support the panel. Where gauging strips 20 are positioned on the mold at points away from the support tubes (such as the gauging strips positioned along the longitudinal edges of the mold as shown in FIG. 1), it is desirable to attach flat spacer strips 29 having the same thickness as a deflated tube next to those gauging strips. Because the spacer strips 29 are the same thickness as a deflated tube, they provide a baseline for measuring their associated gauging strips that is identical to the baseline of the gauging strips that are located next to the supported tube. Thus, the spacer strips 29 permit all gauging strips to be measured without changing the calibration of the measuring device. In a preferred embodiment, the spacer strips 29 are formed of flattened pieces of thin-walled flexible tubing, such as that used to construct the support tubes 22.

The mechanism for inflating and deflating the support tubes includes first and second sets of polyethylene bottles 30 and 36 (FIGS. 2 and 5). One end of each tube is slipped over the bottom of one of the first set of bottles 30. The end of the tube is bonded to the side of the bottle by any adhesive that will create an air-tight seal. A hole 32, formed in the bottom of each of the first set of bottles 30, provides fluid communication between the tubes and bottle interiors. When the tops 34 of the first set of bottles are in place, the bottles plug the ends of the tube so that they can be inflated.

Each of the other ends 25 of the support tubes are slipped over the bottom of one of the second set of bottles 36 and bonded thereto by an air-tight sealing adhesive. The second set of bottles 36 are substantially identical to the first set of bottles 30, including holes 38 formed in each bottom to provide fluid communication between the tube and bottle interiors. The top of each of the second set of bottles 36 is connected to one end of a branch pneumatic conduit 40. The other end of the branch pneumatic conduit 40 is connected to a main pneumatic conduit 42 that extends along the length of the mold on one side thereof (FIG. 1). A pneumatic regulator assembly 44 is connected between the main pneumatic conduit and a pneumatic source conduit 46 that delivers pressurized air from a suitable source (not shown). A preferred pneumatic regulator assembly shown schematically in FIG. 4, includes a supply valve 48 connected to the pneumatic source conduit 46, a regulator 50 connected downstream of the supply valve, and an exhaust valve 52 connected between the regulator 50 and main pneumatic conduit 42.

After the gauging strips 20, spacer strips 29 and support tubes 22 have been positioned atop the mold, in the manner illustrated in the drawings and previously described, the supply valve 48 is opened. Opening the supply valve directs pressurized air from the source conduit into the main pneumatic conduit 42 resulting in the inflation of all of the support tubes 22. The pressurization magnitude relates to the pressurization capacity of the weakest components in the pneumatic system. In the case of most embodiments of the invention, the weakest pneumatic component will be the support tubes. With tubes of 4 mil thickness, it has been determined that the air directed into the support tubes should be regulated to approximately 3 p.s.i.g.

The apparatus is constructed so that if one support tube should rupture while the panel is supported by the tubes the remaining tubes will not deflate. Specifically, the hole 38 formed in each of the second set of bottles 36 is relatively small and acts as a flow restrictor. Thus, regardless of the size of the rupture, the restricted flow into the ruptured tube will prevent a significant pressure drop in the remainder of the pneumatic circuitry and consequent deflation of the other support tubes.

After the tubes are inflated, the panel 12 is lowered onto the tubes, which thereafter support the panel 12 over the mold (FIG. 3). Next, the supply valve 48 is closed and the tubes are deflated by opening exhaust valve 52 and removing the tops 34 of the first set of bottles 30.

If the panel 12 is relatively light in weight, it will only crush the gauging strips by a slight amount. In such instances it may be desirable to add weights to the outer surface of the panel so that the gauging strips will be crushed to a more measurable level. This can be easily accomplished by carefully placing weights 54, such as bags filled with shot, atop the panel, particularly along the outer edge of the panel. It has been found that for panels of 0.20 inch thickness or thicker, approximately 10 pounds per square foot of weight will provide a measurable crushing of the gauging strips without significantly altering the amount of warpage in the panel.

After the panel has completely settled upon the gauging strips 20, the support tubes 22 are reinflated by closing exhaust valve 52, replacing the caps 34 on the first set of bottles 30, and opening the supply valve 48 on the regulator assembly. As the tubes are reinflated, the panel is moved away from the crushed gauging strips (as shown in dotted lines in FIG. 5). Thereafter the panel is removed from its position atop the reinflated tubes.

After the panel is removed, the gauging strips are then carefully removed from the mold 10 for measurement. With reference to FIG. 6, the crushed strips are preferably measured on a surface plate 60 using a base-mounted dial indicator 62 having a low spring force and a large area tip 64. A suitable measuring device is the Model C81S dial indicator with a Model AL 520 flat measuring tip, available from Federal Products Corporation of Providence, R.I. As noted above, preferable crush measurements are made at the location of the measurement nodes. As also noted above, variations in the thickness of the gauging strip along its length are indicative of warpage. For example, referring to FIG. 5, if the thickness of the crushed measurement node at point A is less than the thickness of another measurement node at point B, then the composite panel is warped in a direction away from the mold at point B.

While the present invention has been described in relation to a preferred embodiment is to be understood that various changes, substitutions or equivalents and other alterations can be made without departing from the spirit and scope of the invention. For example, the gauging strips can be configured in other than a spiral shape as long as the foil is readily crushed by the weight of the panel. For instance, the gauging strips may be embossed at regular intervals and layed flat on the lay-up surface of the mold with the embossed portions projecting upwardly, subject to crushing by the panel. Alternatively, a flat strip of foil having upwardly projecting creased tabs formed in it can be placed on the mold such that the tabs are crushed by the panel. These two particular configurations, however, are not as effective as the spiral configuration because they exhibit more spring-back after they are unloaded than does the spiral configuration. That is, the spiral configuration more closely approaches pure inelastic deformation when crushed and thus provides a more accurate determination of the actual extent of warpage of the panel.

Material other than metal foil may be used as the deformable portion of the gauging strips. For example, inelastically deformable putty can be positioned between two thin plastic strips to form a gauging strip. The putty could be in individual pellet form or a continuous bead. One disadvantage of using inelastically deformable putty is that, unlike foil, it does not deform in a linear manner as a constant force is applied to it. Thus, in order to achieve a measurable amount of deformation in gauging strips employing putty, more weight must be applied to the panel than is necessary to achieve a corresponding amount of deformation when using a strip that deforms in a linear manner. In most cases, this added weight will distort the panel shape by an unacceptable amount for accurately measuring warpage.

It is contemplated that a gauging apparatus formed in accordance with this invention can be used where a mold is configured with at least a portion of it in a substantially vertical plane (for example, a mold for a wing panel that includes an upwardly projecting curved portion that defines the leading or trailing edge of the wing). In such a situation, it will be necessary to employ suitable mechanisms for moving the panel in a gradual manner evenly against the support tubes and the gauging strips without distorting the shape of the panel.

It is also contemplated that the support tubes and/or gauging strips could be attached to the panel before it is moved against the lay-up surface of the mold. This method, however, is probably not more convenient than applying the support tubes and gauging strips to the stationary mold.

The embodiments of the invention in which an exclusive property or privilege is defined are as follows:

1. An apparatus for gauging differences between the shape of a part and the shape of a mold upon which the part was formed, comprising:
   (a) a plurality of elongate substantially inelastically deformable members;
   (b) control means for moving the part into a gauging position wherein the part is adjacent to the mold in contact with the deformable members so that the deformable members are partially deformed; and,
   (c) measuring means for measuring the amount of deformation in the deformable member at selected points along the deformable member.

2. The apparatus of claim 1 wherein the deformable members are formed of foil.

3. The apparatus of claim 2 wherein the deformable members are configured to be twisted about their longitudinal axes.

4. The apparatus of claim 3 wherein the deformable members are formed of aluminum.

5. The apparatus of claim 4 further including indicia placed on the deformable members at selected locations.

6. The apparatus of claim 2 wherein the deformable members are formed of aluminum.

7. The apparatus of claim 6 wherein the deformable members are configured to be twisted about their longitudinal axes.

8. The apparatus of claim 1 further including indicia placed on the deformable members at selected locations.

9. The apparatus of claim 8 wherein the deformable members are formed of oil.

10. The apparatus of claim 9 wherein the deformable members are configured to be twisted about their longitudinal axes.

11. The apparatus of claim 10 wherein the deformable members are formed of aluminum.

12. The apparatus of claim 1 wherein the control means is substantially disposed between the part and the mold.

13. The apparatus of claim 12 wherein the control means includes inflatable elements positioned alongside selected deformable members, the control means further including regulator means connected to the inflatable elements for selectively inflating and deflating the elements, the control means being configured so that when the elements are inflated they are capable of supporting the part near the mold while preventing contact between the part and the deformable members, the control means also being configured so that when the elements are deflated the part moves into the gauging position.

14. The apparatus of claim 13 wherein the deformable members are formed of foil.

15. The apparatus of claim 14 wherein the deformable members are configured to be twisted about their longitudinal axes.

16. The apparatus of claim 15 wherein the deformable members are formed of aluminum.

17. An apparatus for measuring differences between the shape of a part and the shape of a mold upon which the part was formed, comprising:
   (a) a plurality of elongate substantially inelastically deformable members; and,
   (b) control means for moving the part into a gauging position wherein the part is adjacent to the mold in contact with the deformable members so that the deformable members are partially deformed, variations in the amount of deformation along the length of each deformable member being indicative of the difference between the shape of the part and the shape of the mold upon which the part was formed, and variations in the deformation between any two deformable members being indicative of the difference between the shape of the part and the shape of the mold upon which the part was formed.

18. The apparatus of claim 17 wherein the deformable members are strips of foil twisted about their longitudinal axes.

19. The apparatus of claim 17 wherein the control means includes inflatable elements positioned alongside selected deformable members, the control means further including regulator means connected to the inflatable elements for selectively inflating and deflating the elements, the control means being configured so that when the elements are inflated they are capable of supporting the part near the mold while preventing contact between the mold and the deformable members, the control means also being configured so that when the elements are deflated, the part moves into the gauging position.

20. The apparatus of claim 19 wherein the deformable members are strips of foil twisted about their longitudinal axes.

21. A method for gauging the differences between the shape of a part and the shape of a mold surface upon which the part was formed, including the steps of:
   (1) placing elongate substantially inelastically deformable members on the mold;
   (2) positioning the part adjacent to the mold in contact with the deformable members so that the deformable members are partially deformed;
   (3) moving the part away from the deformable members; and,
   (4) measuring the amount of deformation in the deformable members at selected points along the deformable members.

22. The method of claim 21 wherein step 2 comprises the substeps of:
   (2a) placing inflatable elements near selected deformable members;
   (2b) inflating the elements;
   (2c) placing the part on the inflated elements so that it is supported by the elements but prevented from contacting the deformable members; and
   (2d) deflating the elements until the part contacts the deformable members so that the deformable members are partially deformed.

23. The method of claim 22 wherein step (3) is comprised of the substeps of:
   (3a) inflating the elements so that the part is moved away from the deformable members; and,
   (3b) moving the part away from the mold.

* * * * *

UNITED STATES PATENT AND TRADEMARK OFFICE
CERTIFICATE OF CORRECTION

PATENT NO. : 4,703,648
DATED : November 3, 1987
INVENTOR(S) : J.M. Baresh

It is certified that error appears in the above-identified patent and that said Letters Patent is hereby corrected as shown below:

Column 8, line 8, "oil" should be --foil--.

Signed and Sealed this

Twenty-fourth Day of May, 1988

Attest:

DONALD J. QUIGG

Attesting Officer

Commissioner of Patents and Trademarks